H. B. THOMAS.
Damper.

No. 34,925.

Patented April 8, 1862.

Witnesses

Inventor

UNITED STATES PATENT OFFICE.

HENRY B. THOMAS, OF RACINE, WISCONSIN, ASSIGNOR TO J. W. ENGLISH, OF SAME PLACE.

IMPROVEMENT IN DAMPERS.

Specification forming part of Letters Patent No. 34,925, dated April 8, 1862.

*To all whom it may concern:*

Be it known that I, HENRY BEECHER THOMAS, of Racine, in the county of Racine and State of Wisconsin, have invented a new and Improved Valve to be used as a Damper or Heat-Controlling Valve in Stove-Pipes and other Conductors of Smoke and Heat; and I do hereby declare that the following is a full, clear, and exact description of the same, reference being had to the accompanying drawings, forming part of this specification, in which—

Figure 1:
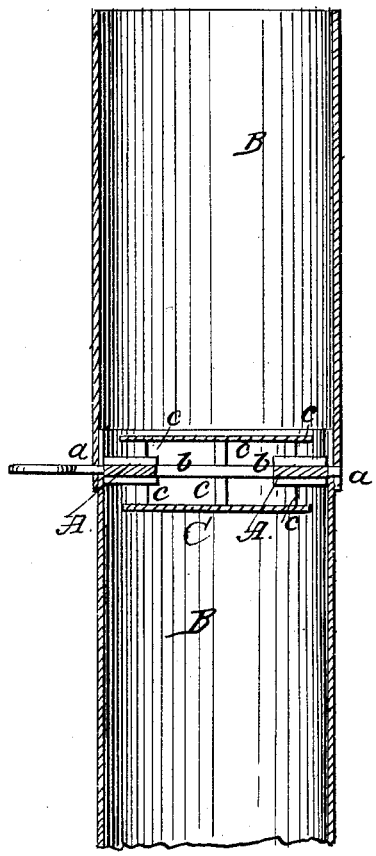
Figure 2:
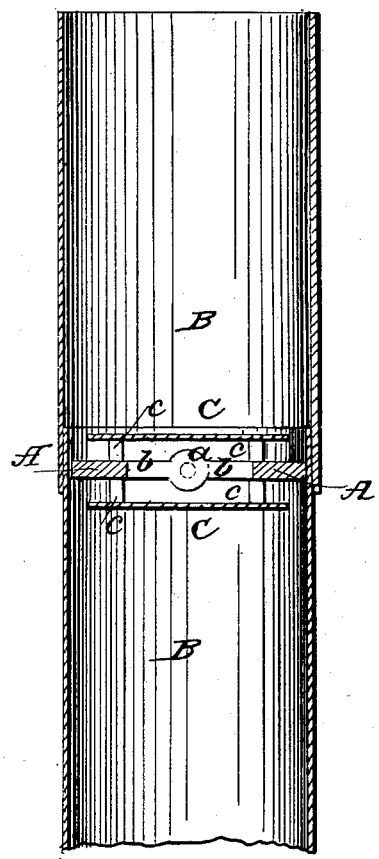
Figure 3:
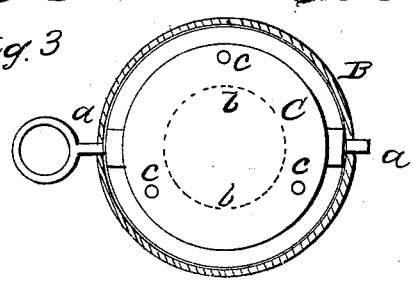

Figures 1 and 2 are central longitudinal sections at right angles to each other of a stove-pipe having my improved valve applied as a damper. Fig. 3 is a transverse section of the same.

Similar letters of reference indicate corresponding parts in the several figures.

My improved valve consists of a ring or annular plate fitted with a transverse spindle, like a butterfly-valve, or ordinary damper, and having attached to it on opposite sides two disks of smaller diameter than its exterior, so arranged that when the ring is fitted to a smoke-pipe or other circular conductor and the ring is brought to a position square across the pipe or conductor, in which an ordinary butterfly-valve or damper is closed, there is a passage left round the valve between the ring and plates, so that while the draft or escape of heat is checked the escape of smoke is not prevented, and the heat is thrown equally against the whole circumference of the pipe.

To enable others to make and use my invention, I will proceed to describe it with reference to the drawings.

A is the ring or annular plate constituting the principal portion of the valve, made of an external diameter to fit snugly within the pipe B.

$a\ a$ indicate the spindle or journals with which the said plate is provided, like an ordinary damper or throttle-valve, fitted to bearings in opposite sides of the pipe.

C C are the two disks, made without any openings, of a diameter smaller than the external diameter of the ring or plate A, but larger than the diameter of the opening $b\ b$ thereof. These plates C C are secured to the ring or plate A by studs or shouldered rivets $c\ c$, which hold them parallel and concentric with the said ring or plate, but at some distance from and on opposite sides of it.

Figs. 1 and 2 illustrate the action of the valve, which is represented in both of said figures in the position square across the pipe, in which an ordinary damper or butterfly-valve would be closed. In this position, however, though it checks the draft or passage of the heat, it does not entirely close the passage, but permits the escape of smoke, as indicated by the arrows—that is to say, around the plates C C, between the said plates and the ring A, and through the ring, and as it does so it distributes the heat evenly all round the pipe, throwing it out against the surface thereof.

What I claim as my invention, and desire to secure by Letters Patent, is—

The valve composed of the ring and annular plate A, and the two disks C C and spindle or journals $a\ a$, the whole arranged and applied in combination with each other, substantially as herein specified.

HENRY B. THOMAS.

Witnesses:
WILLIAM H. JENKS,
D. McDONALD.